(12) United States Patent
Hashimura

(10) Patent No.: US 7,837,244 B2
(45) Date of Patent: Nov. 23, 2010

(54) AUTOMOBILE BODY REINFORCEMENT WITH EXCELLENT BENDING CRUSH CHARACTERISTICS

(75) Inventor: Toru Hashimura, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 0 days.

(21) Appl. No.: 12/370,007

(22) Filed: Feb. 12, 2009

(65) Prior Publication Data

US 2010/0201139 A1    Aug. 12, 2010

(51) Int. Cl.
    *B60R 19/02*    (2006.01)
(52) U.S. Cl. ..................................... 293/102
(58) Field of Classification Search ............. 293/102, 293/120, 132, 133; 296/187.09
    See application file for complete search history.

(56) References Cited

U.S. PATENT DOCUMENTS

| | | | |
|---|---|---|---|
| 5,201,912 A * | 4/1993 | Terada et al. ............... | 293/120 |
| 6,209,934 B1 * | 4/2001 | Sakuma et al. .............. | 293/120 |
| 6,481,690 B2 | 11/2002 | Kariatsumari et al. | |
| 6,709,044 B2 * | 3/2004 | Frank ......................... | 293/102 |
| 6,808,215 B2 * | 10/2004 | Sakuma et al. .............. | 293/102 |
| 6,851,731 B2 * | 2/2005 | Janssen ....................... | 293/102 |
| 6,893,062 B2 * | 5/2005 | Amano et al. ............... | 293/102 |
| 7,100,952 B2 * | 9/2006 | Reierson et al. ............. | 293/102 |
| 7,159,911 B2 * | 1/2007 | Nguyen et al. .............. | 293/102 |
| 7,163,241 B2 * | 1/2007 | Liu et al. .................... | 293/102 |
| 7,210,719 B2 * | 5/2007 | Honda et al. ................ | 293/155 |
| 7,484,779 B2 * | 2/2009 | Takahashi ................... | 293/117 |
| 7,503,601 B2 * | 3/2009 | Agrahari ..................... | 293/102 |
| 7,537,252 B2 * | 5/2009 | Nagai et al. ................. | 293/102 |
| 2004/0084910 A1 * | 5/2004 | Amano et al. ............... | 293/102 |
| 2004/0135382 A1 * | 7/2004 | Sakuma et al. .............. | 293/102 |

FOREIGN PATENT DOCUMENTS

| | | |
|---|---|---|
| JP | 6-286536 | 10/1994 |
| JP | 2001-26245 | 1/2001 |
| JP | 2001-225763 | 8/2001 |
| JP | 2002-225652 | 8/2002 |
| JP | 2004-262300 | 9/2004 |

* cited by examiner

*Primary Examiner*—Glenn Dayoan
*Assistant Examiner*—Gregory Blankenship
(74) *Attorney, Agent, or Firm*—Oblon, Spivak, McClelland, Maier & Neustadt, L.L.P.

(57) ABSTRACT

An automobile body reinforcement including a hollow aluminum alloy extrusion having an approximately rectangular cross-section is structured as follows: (a) a front wall, a rear wall, an upper horizontal wall, a lower horizontal wall, and an intermediate horizontal wall are provided; (b) the front and rear walls are each at least 3 mm thick; (c) the upper and lower horizontal walls divide each of the front and rear walls thereby defining upper and lower end portions of each of the front and rear walls as flange portions; and (d) the front wall has a concave portion formed in a middle portion thereof and the concave portion is connected to a front end of the intermediate wall. The aluminum alloy automobile body reinforcement structured as described above that may be, for example, a bumper reinforcement or a door guard bar has high bending crush characteristics, for example, high bending strength and high energy absorbability against the bending load generated at a time of a vehicle collision and can provide high collision safety without requiring an additional reinforcement.

3 Claims, 7 Drawing Sheets

AUTOMOBILE BODY REINFORCEMENT WITH EXCELLENT BENDING CRUSH CHARACTERISTICS

BACKGROUND OF THE INVENTION

1. Field of the Invention

The present invention relates to an aluminum alloy automobile body reinforcement, for example, a bumper reinforcement or a door guard bar which has, as its bending crush characteristics, high bending strength and high energy absorbability against the bending load generated at a time of a vehicle collision and which can provide high collision safety without requiring an additional reinforcement.

2. Description of the Related Art

As is well known, an automobile body is provided with many automobile body reinforcements such as bumper reinforcements and door guard bars. For example, each of the bumpers attached to a front end portion and a rear end portion of an automobile body is, as widely known, internally provided with a bumper reinforcement (also referred to as a bumper armature) for strengthening the bumper. Such a bumper reinforcement has an approximately rectangular cross-section. It is, as well known, positioned between a bumper and an automobile body such that it approximately horizontally extends in the automobile body width direction. The bumper reinforcement makes up, together with the bumper and stays or crashboxes provided behind the bumper, an energy absorption member for absorbing the impact energy generated at a time of a collision.

A bumper reinforcement is fixedly connected, via support members such as bumper stays having an approximately rectangular hollow cross-section, to body frame members such as front side members or rear side members extending in the body longitudinal direction from behind the bumper face that may be subjected to a collision. When an automobile provided with a bumper reinforcement supported as described above collides with an object, the bumper reinforcement absorbs the resultant impact energy by being crush-deformed in the automobile body longitudinal direction and thereby protects the automobile body. Namely, each bumper reinforcement included in an automobile is required to be capable of, when the automobile collides with an object and a large impact load is applied to it, absorbing the impact load energy by being bent-deformed and/or crush-deformed without being broken and flying apart. Other automobile body reinforcements, for example, door guard bars (door beams) with which automobile doors are internally provided to prevent, when the automobile collides at a side thereof with an object, the door on the same side from being deformed into the automobile interior and to thereby protect passengers are also required to have capability and a support structure basically the same as those described above.

In recent years, automobile body reinforcements are made of high-strength extrusions (having a longitudinally uniform cross-section) of, for example, 5000-, 6000-, or 7000-series aluminum alloy instead of steel which used to be in use. Compared with steel on a same weight basis, aluminum alloy excels in impact energy absorbability. As for productivity, aluminum alloy extrusions with a longitudinally uniform, approximately rectangular hollow cross-section offering high strength and rigidity can be efficiently produced in large quantities. Hence, aluminum alloy extrusions can be suitably used for automobile body reinforcements for absorbing impact energy in case of a vehicle collision.

There are various collision tests to which automobile body reinforcements such as bumper reinforcements are subjected. They include, for example, pole collision tests, barrier collision tests, and offset collision tests. Automobile body reinforcements, for example, bumper reinforcements made of aluminum alloy to be put in use are increasingly required to offer enhanced strength characteristics so as to increase safety against a vehicle collision. Take a collision with a pole (also referred to as a pole collision) which the present invention takes into consideration, for example. When an automobile collides with a pole, the load generated by the collision is approximately horizontally applied concentratedly to a local portion of the bumper reinforcement provided for the bumper subjected to the collision of the automobile. In such a case, depending on the magnitude of the load, the crush strength of the bumper reinforcement may turn out inadequate.

The behavior of an aluminum alloy bumper reinforcement at a time of a pole collision will be described more concretely with reference to FIGS. 7A and 7B showing plan views of an automobile. Referring to FIG. 7A, assume that an automobile body A collides with an object C which may be a fire hydrant, an electric pole, or a gatepost. The load generated by the collision is approximately horizontally applied concentratedly to the portion subjected to the collision of a rear bumper reinforcement 110. The same happens to the front bumper reinforcement if the automobile forwardly collides with a similar object. If the load is larger than bearable by the bumper reinforcement 110, the bumper reinforcement 110 may be horizontally bent at a middle portion thereof as shown in FIG. 7B to damage the automobile body A. This can happen, depending on the magnitude of the load, not only to an aluminum alloy bumper reinforcement having an approximately rectangular, simple hollow cross-section but also to an aluminum alloy bumper reinforcement provided with internal ribs for added strength.

To prevent a bumper reinforcement from bending at a time of a pole collision, it is necessary to increase the crush strength of the bumper reinforcement. Measures which can be taken to increase the crush strength of bumper reinforcements may include: increasing the strength of hollow aluminum alloy extrusions used to make automobile body reinforcements such as bumper reinforcements; increasing the wall thicknesses of hollow aluminum alloy extrusions; and increasing the vertical width of bumper reinforcements. There is, however, a limit in increasing the strength of aluminum alloy extrusions. This is because excessively increasing the strength of an aluminum alloy makes it difficult to extrude the aluminum alloy into desired shapes or bend extrusions of the aluminum alloy as desired. Furthermore, excessively strengthened aluminum alloy extrusions can easily crack, so that the amount of energy absorption by bumper reinforcements made of such aluminum alloy extrusions decrease. Increasing the wall thicknesses of hollow aluminum alloy extrusions used to make bumper reinforcements or increasing the vertical widths of bumper reinforcements makes the bumper reinforcements heavier and decreases the advantage of using lightweight hollow aluminum alloy extrusions, so that there is a limit in doing so, too.

A known measure taken for a bumper reinforcement against a possible pole collision is to reinforce a longitudinal middle portion, which is relatively easily bent by an impact load, of the bumper reinforcement by attaching an additional reinforcement thereto. In fact, there are many cases in which an additional aluminum or steel reinforcement is attached to the surface on the colliding side of a bumper reinforcement. To make a bumper reinforcement strong enough by such a measure, however, causes demerits, too. Namely, attaching such an additional reinforcement to a bumper reinforcement increases the total weight of the bumper reinforcement, the total number of parts required, and hence the total cost of the bumper reinforcement. Taking such a measure, therefore, makes the aluminum alloy bumper reinforcement almost as heavy as a steel bumper reinforcement, so that the advantage of using lightweight aluminum alloy is reduced.

In the above regard, it has been proposed to attach an additional reinforcement made of aluminum alloy, instead of steel, to a bumper reinforcement. In the reinforcement structure disclosed in JP-A No. H06-286536, for example, an additional hollow aluminum alloy reinforcement is fixedly bonded to a longitudinal middle portion of a bumper reinforcement. In the bumper reinforcement structure disclosed in JP-A No. 2001-225763, an additional aluminum alloy reinforcement having an open cross-section is provided on the front side of a bumper reinforcement. Furthermore, in JP-A No. 2004-262300, a bumper reinforcement which is made of a hollow aluminum alloy extrusion having an approximately rectangular cross-section and which can be reinforced using existing bumper space is proposed. According to the proposal, an additional reinforcement shorter than a bumper reinforcement and having an approximately rectangular cross-section is integrally attached, to be approximately parallel with the bumper reinforcement, to an upper or lower portion in a longitudinal middle part of the bumper reinforcement.

A technique has been known in which the front wall of a hollow aluminum alloy extrusion having a middle rib is provided with a concave portion formed in a middle portion thereof not as a measure against a pole collision but as a measure to improve the energy absorption performance and the crush strength at a time of an offset collision of the hollow aluminum alloy extrusion (see JP-A No. 2001-26245 and JP-A No. 2002-225652, for example). The concave portion formed in the middle portion of the front wall of the bumper reinforcement increases the crush strength of the front wall.

When a bumper reinforcement is subjected to a pole collision test performed at a high collision speed according to a new severe standard, the crush strength of the bumper reinforcement turns out inadequate even with an existing type of an additional reinforcement attached to the bumper reinforcement. Namely, the bending strength against the bending load generated at a time of a vehicle collision of the bumper reinforcement is inadequate. Moreover, to attach such an existing type of an additional reinforcement to the bumper reinforcement, it is necessary to secure a special installation space in the bumper interior where space availability is limited. This makes it necessary to change the bumper design or automobile body design. In other words, such an additional reinforcement made of aluminum alloy cannot be used in cases where the design of a bumper or automobile body cannot be changed to secure space required to mount the additional reinforcement.

In view of severer collision tests to be passed based on a new standard, only forming, as mentioned above, a concave portion in a middle portion of the front wall of a bumper reinforcement so as to reduce the width-thickness ratio (wall width/wall thickness) and increase the crush strength of the front wall of the bumper reinforcement cannot adequately increase the crush strength against a pole collision of the bumper reinforcement. Namely, the bending strength against the bending load generated at a time of a vehicle collision of the bumper reinforcement is inadequate.

A bumper reinforcement is required to have not only high crush strength against a vehicle collision but also high energy absorbability. When an automobile collides with an object, the load generated by the collision is applied to a bumper reinforcement used in the automobile. When such a collision occurs, the bumper reinforcement is required to prevent the load from quickly decreasing from a maximum level thereof and absorb as much of the load energy as possible so as to reduce damage to the automobile body. The amount of energy absorbed by the bumper reinforcement at the collision is calculated by integrating the amount of the load applied to deform the bumper reinforcement and the amount of deformation of the bumper reinforcement. Other automobile body reinforcements, for example, door guard bars (door beams) are also required to have the energy absorbability as described above. A door guard bar with which an automobile door is internally provided serves to prevent, when the automobile collides at a side of the door with an object, the door from being deformed into the automobile interior and thereby protect passengers.

Thus, automobile body reinforcements are increasingly required to have, as their bending crush characteristics, high bending strength against the bending load generated at a time of a vehicle collision and high energy absorbability. An object of the present invention is to provide an aluminum alloy automobile body reinforcement, for example, a bumper reinforcement or a door guard bar which, having excellent bending crush characteristics, can provide high collision safety without requiring an additional reinforcement.

SUMMARY OF THE INVENTION

To achieve the above object, the present invention provides an automobile body reinforcement including a hollow aluminum alloy extrusion having an approximately rectangular cross-section. In the automobile body reinforcement: (a) the approximately rectangular cross-section includes a front wall extending approximately vertically, a rear wall being spaced from the front wall and approximately vertically extending approximately in parallel with the front wall, an upper wall and a lower wall being spaced from each other and extending approximately horizontally, and an intermediate wall approximately horizontally extending and interconnecting middle portions of the front and rear walls; (b) the front and rear walls are each at least 3 mm thick, and the upper, lower, and intermediate walls are thinner than the front and rear walls; (c) the upper wall interconnects an upper portion lower than an upper end of the front wall and an upper portion lower than an upper end of the rear wall, the lower wall interconnects a lower portion higher than a lower end of the front wall and a lower portion higher than a lower end of the rear wall, and upper and lower end portions of each of the front and rear walls form flange portions extending upwardly and downwardly, respectively; and (d) a front end connected to the front wall of the intermediate wall is closer to the rear wall than front ends connected to the front wall of the upper and lower walls, and the front wall has a concave portion extending along a longitudinal direction of the automobile body reinforcement.

In the automobile body reinforcement structure according to one aspect of the present invention, in the first place, the front and rear walls of the automobile body reinforcement are made relatively thick in accordance with the requirement (b), thereby increasing the crush strength of the front wall. Next, in accordance with the requirement (d), the surface against the direction of a possible collision of the front wall is arced forming a portion concave toward the rear wall, thereby increasing the crush strength of the front wall. Furthermore, in accordance with the requirements (d) and (c), the wall width of the front wall is reduced to decrease the width-thickness ratio (wall width/wall thickness) of the front wall, thereby increasing the crush strength of the front wall. Still furthermore, in accordance with the requirement (c), the wall width of the rear wall is reduced to decrease the width-thickness ratio (wall width/wall thickness) of the rear wall, thereby increasing the crush strength of the rear wall. Each of the "wall widths" referred to above refers to the width of a single flat faced portion of a wall, the portion undivided by other walls connected to the wall.

In the automobile body reinforcement structure according to the aspect of the present invention, the crush strength of each of the front and rear walls is improved as described above resulting in improved bending strength of the automobile body reinforcement. Therefore, even when the automobile including the automobile body reinforcement collides with a pole generating a load which is approximately horizontally applied concentratedly to the portion subjected to the collision of the automobile body reinforcement, the automobile body reinforcement is not easily buckled or bent. Since the decrease in the reactive load following the generation of a maximum impact load becomes relatively small, the amount of energy absorption per unit deformation by the automobile body reinforcement increases and damage to the automobile body decreases. The present invention makes it possible to achieve the above effects against a pole collision, which are comparable to corresponding effects achieved by using an additional reinforcement, of the automobile body reinforcement without using any additional reinforcement. The effects of improving the bending crush characteristics such as the bending strength against the bending load generated at a time of a vehicle collision and impact energy absorbability of the automobile body reinforcement can be obtained also when the automobile body reinforcement is other than a bumper reinforcement and also when the object with which the automobile collides is other than a pole. Thus, the present invention can provide a safe, light, and space-saving automobile body reinforcement which can meet automobile collision test criteria inclined to be made increasingly severe.

In the automobile body reinforcement according to the aspect of the present invention, the rear wall is preferably thicker than the front wall.

In the automobile body reinforcement according to the aspect of the present invention, the ratio of Wd to Wb is preferably in a range of 0.08 to 0.1, where Wd is the vertical width of each of the flange portions and Wb is the vertical width of the rear wall.

BRIEF DESCRIPTION OF THE DRAWINGS

The above and other objects, features and advantages of the present invention will become apparent from the following description taken in connection with the accompanying drawings, in which.

DETAILED DESCRIPTION OF THE PREFERRED EMBODIMENTS

An embodiment in which a bumper reinforcement is used as an automobile body reinforcement according to the present invention will be described in detail below with reference to drawings, focusing on the strength against a pole collision of the bumper reinforcement.

Overall Shape and Structure of Bumper Reinforcement

Figure 1:
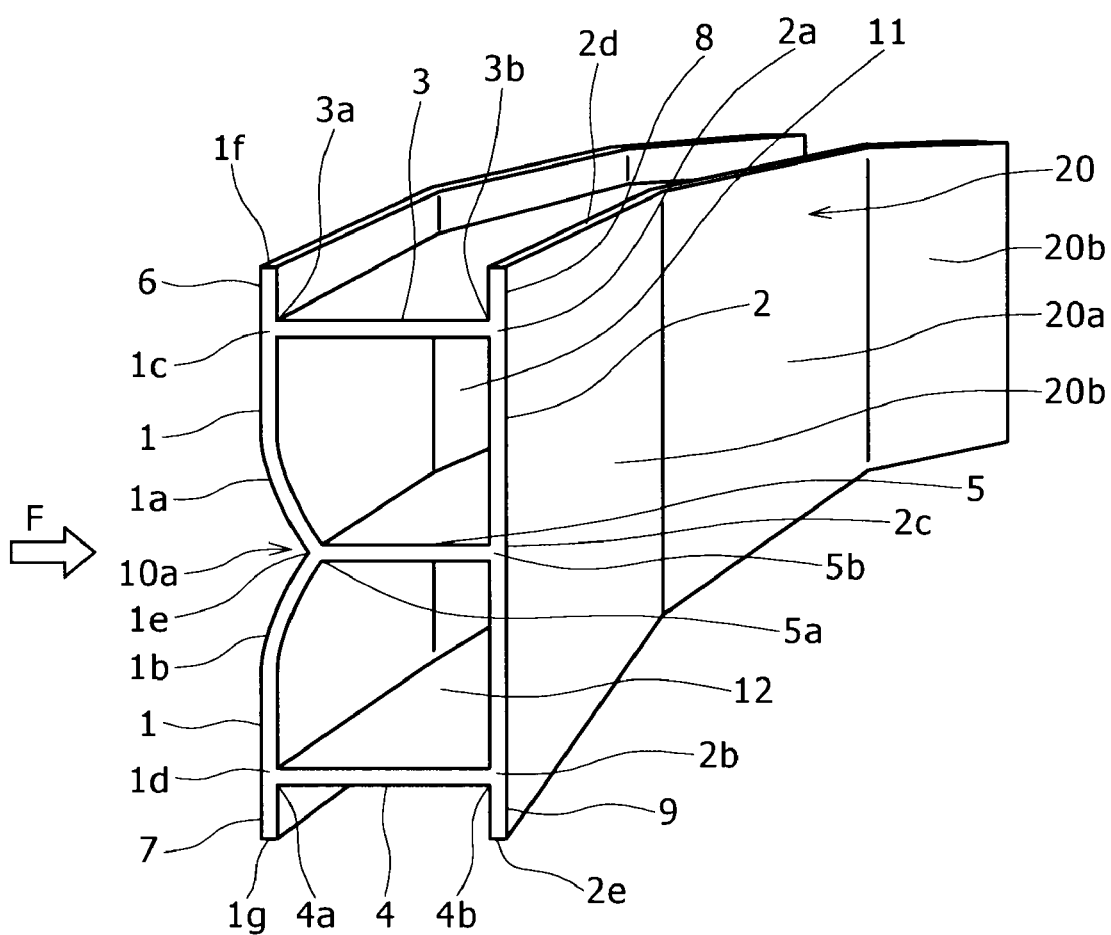
FIG. 1 is a perspective view of a bumper reinforcement according to an embodiment of the present invention.
Figure 4:
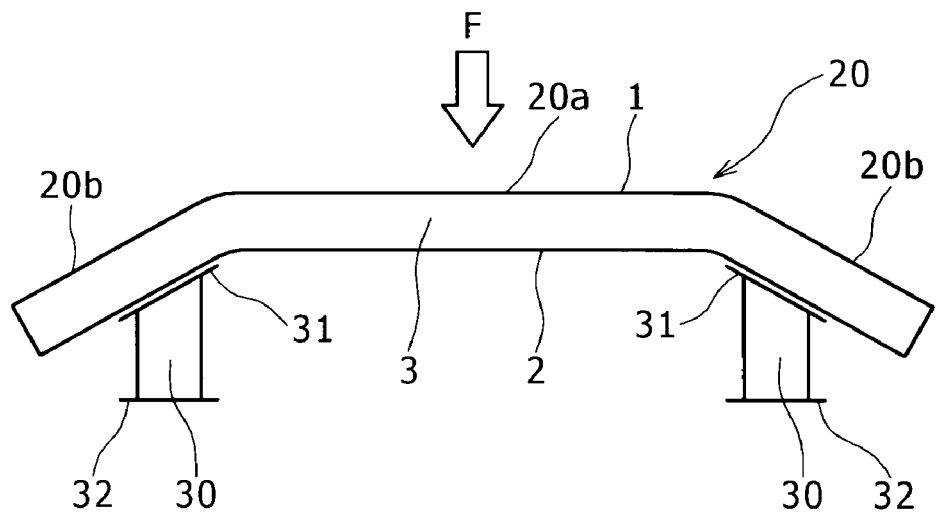
FIG. 4 is a plan view of the bumper reinforcement shown in FIG. 1.

FIG. 1 shows a perspective view of an aluminum alloy bumper reinforcement according to an embodiment of the present invention. FIG. 4 shows a plan view of the bumper reinforcement shown in FIG. 1. FIGS. 1 and 4 show the bumper reinforcement 20 extending approximately horizontally in the vehicle width direction. In many cases, the bumper reinforcement 20 designed to match a vehicle body design is not longitudinally linear whether it is for a front bumper or for a rear bumper. As shown in FIGS. 1 and 4, its longitudinal end portions are horizontally bent (bent rightwardly as seen in FIG. 1 or downwardly as seen in FIG. 4). Thus, the bumper reinforcement 20 shown in FIGS. 1 and 4 has a linearly bent portion 20b in each of the longitudinal (left and right) end portions and a middle linear portion 20a.

The bumper reinforcement according to the present invention may be longitudinally curved having a linear or curved bent portion in each of its longitudinal end portions, or it may be entirely longitudinally curved or linear.

As shown in FIG. 4, the bumper reinforcement 20 of the present embodiment is, like a general bumper reinforcement, supported by a cylindrical stay 30 at a back (a rear side) of each of the bent portions 20b. The bumper reinforcement 20, whether it is for a front bumper or for a rear bumper, is supported by the vehicle body via the stays 30 each joined to a side member, not shown, of the vehicle body.

Stay

As shown in FIG. 4, each of the stays 30 has a front flange 31 and a rear flange 32. The stays 30 are joined, either by welding or mechanically, to the back (rear sides) of the bent portions 20b, respectively, via the front flanges 31. The rear flanges 30 are each joined, either by welding or mechanically, to a front flange of a side member, not shown, of the vehicle body. Since, as shown in FIG. 4, the stays 30 are joined to the rearwardly bent portions of the bumper reinforcement 20, the front face of each of the stays 30, whether it is cylindrical or not, is so inclined or formed as to fit the linear or curved rear side portions of the rearwardly bent portions of the bumper reinforcement 20.

The stays 30 may be made of either steel or aluminum alloy. To make the stays 30 lighter, they are preferably cylindrical or otherwise formed hollowly. As for their material, an appropriate one is selected out of steel, for example, common steel or high-tension strength steel and aluminum alloy for extrusion. When the bumper reinforcement according to the present invention is formed as a bumper reinforcement integrated with stays, it can be fixed to a side member of a vehicle body via the stays quite easily and simply.

Cross-Sectional Shape of Bumper Reinforcement

Requirement (a)

The bumper reinforcement 20 (hollow formed) has, as shown in FIG. 1, an approximately rectangular (closed) cross-section including an intermediate wall. FIG. 1 shows a cross-section (sectional side view) of the (hollow formed) bumper reinforcement 20 for a front or rear bumper as seen from a left side of the vehicle body.

The bumper reinforcement 20 has a front wall 1 extending approximately in the vehicle height direction (in the up-down direction as seen in FIG. 1) and a rear wall 2 extending, being spaced from the front wall 1, in approximately the same direction as and approximately in parallel with the front wall 1. The front wall 1 erected to oppose the direction of collision or collision load F is also referred to as a front vertical wall, collision-side wall, or front flange. The rear wall 2 rearwardly (rightwardly as seen in FIG. 1) spaced from the front wall 1 is also referred to as a rear vertical wall or rear flange.

The bumper reinforcement 20 also has, in addition to the front wall 1 and rear wall 2, upper and lower walls 3 and 4 positioned apart from each other and extending approximately horizontally. The upper wall 3 connects upper portions 1c and 2a of the front wall 1 and rear wall 2. Namely, ends 3a and 3b of the upper wall 3 are connected to the upper portions 1c and 2a of the front wall 1 and rear wall 2, respectively, so that the upper wall 3 is approximately perpendicular to the front wall 1 and rear wall 2. The lower wall 4 connects lower portions 1d and 2b of the front wall 1 and rear wall 2. Namely, ends 4a and 4b of the lower wall 4 are connected to the lower portions 1d and 2b of the front wall 1 and rear wall 2, respectively, so that the lower wall 4 is perpendicular to the front wall 1 and rear wall 2. The upper wall 3 and lower wall 4 are also referred to as side walls or webs.

The bumper reinforcement 20 also has an intermediate wall (intermediate horizontal wall) 5 extending approximately horizontally. The intermediate wall 5 connects intermediate portions 1e and 2c of the front wall 1 and rear wall 2. Namely, ends 5a and 5b of the intermediate wall 5 are respectively connected to the intermediate portions 1e and 2c of the front wall 1 and rear wall 2 standing approximately vertically, so that the intermediate wall 5 is perpendicular to the front wall 1 and rear wall 2. The intermediate wall 5 is also referred to as an intermediate rib or a reinforcement wall. Thus, the bumper reinforcement 20 (hollow formed) has a closed cross-sectional structure including two hollow partitions, i.e. upper and lower hollow partitions 11 and 12.

Requirement (b)

According to the present embodiment, the front wall 1 and rear wall 2 of the bumper reinforcement 20 are relatively thick each measuring 3 mm or more so as to enhance the crush strength of the front wall 1 and rear wall 2. Unless the front wall 1 and rear wall 2 are made at least 3 mm thick, the strength against a pole collision of the aluminum alloy bumper reinforcement itself cannot be increased, regardless of its cross-sectional shape, to a level generally achievable in cases where an additional reinforcement is used. When the front wall 1 and rear wall 2 are thinner than 4 mm, however, the strength against a pole collision of the bumper reinforcement may turn out inadequate. It is therefore preferable that the front wall 1 and rear wall 2 be made at least 4 mm thick. The front wall 1 and rear wall 2 may have either a same thickness or mutually different thicknesses.

The thicknesses of the upper wall 3 and lower wall 4 do not contribute toward improving the strength against a pole collision of the bumper reinforcement so much as the thicknesses of the front wall 1 and rear wall 2 do. Therefore, the upper wall 3 and lower wall 4 are only required to be at least strong enough to withstand a concentrated load to which they are subjected when the automobile collides with a pole. Hence, they can be made thinner than the front wall 1 and rear wall 2. To make the bumper reinforcement lighter in weight, the upper wall 3, lower wall 4, and intermediate wall 5 are preferably thinner than the front wall 1 and rear wall 2. To be concrete, in the bumper reinforcement, when the front wall 1 and rear wall 2 are 4 mm or more thick, the upper wall 3, lower wall 4, and intermediate wall 5 are preferably 2 to 3.5 mm thick.

Requirement (c)

The bumper reinforcement 20 (hollow formed) is, besides having a closed cross-sectional structure including the two hollow partitions, i.e. the upper and lower hollow partitions 11 and 12 as shown in FIG. 1, structured such that the front wall 1 and rear wall 2 can be provided with flanges at their upper end portions and lower end portions.

Namely, the upper wall 3 interconnects the front wall 1 and rear wall 2 not at their upper ends 1f and 2d but at their upper portions 1c and 2a located lower than their upper ends 1f and 2d. Similarly, the lower wall 4 interconnects the front wall 1 and rear wall 2 not at their lower ends 1g and 2e but at their lower portions 1d and 2b located higher than their lower ends 1g and 2e. With the upper wall 3 and lower wall 4 perpendicularly joined to the front wall 1 and rear wall 2 at the upper portions 1c and 2a and at the lower portions 1d and 2b, respectively: upper and lower end portions extending from the upper portion 1c to the upper end if and from the lower portion 1d to the lower end 1g, respectively, of the front wall 1 form upwardly and downwardly projecting flanges 6 and 7, respectively; and upper and lower end portions extending from the upper portion 2a to the upper end 2d and from the lower portion 2b to the lower end 2e, respectively, of the rear wall 2 form upwardly and downwardly projecting flanges 8 and 9, respectively. Thus, according to the present invention, the upper wall 3 and lower wall 4 define the upwardly and downwardly projecting portions of the front wall 1 and rear wall 2 thereby forming the flanges 6, 7, 8, and 9 upwardly or downwardly projecting from where the upper wall 3 and lower wall 4 join the front wall 1 and rear wall 2.

As described above, according to the requirement (c): the front wall 1 is divided into a middle front wall portion, an upper flange 6, and a lower flange 7; and the rear wall 2 is divided into a middle rear wall portion, an upper flange 8, and a lower flange 9. Thus, the (vertical) width of each of the single front wall 1 and single rear wall 2 is divided into the upper flange, lower flange, and the middle front wall portion or middle rear wall portion, so that the width of each of the middle front and rear wall portions is smaller than the width of each of the single front wall 1 and single rear wall 2 by the sum of widths of each pair of the upper and lower flanges. The width of each of the upper and lower flanges is also small. This reduces, as described later, the width-thickness ratio (wall width divided by wall thickness) and increases the crush strength of the front wall 1 of the bumper reinforcement 20.

Requirement (d)

The bumper reinforcement 20 (hollow formed) is, besides having a closed cross-sectional structure including two hollow partitions, i.e. the upper and lower hollow partitions 11 and 12, provided, as shown in FIG. 1, with a concave portion 10a longitudinally extending along a middle portion 1e of the front wall 1. The concave portion 10a has an arced surface concave toward the rear wall 2 (in the direction of arrow F, i.e. rightward as seen in FIG. 1).

Figure 3:
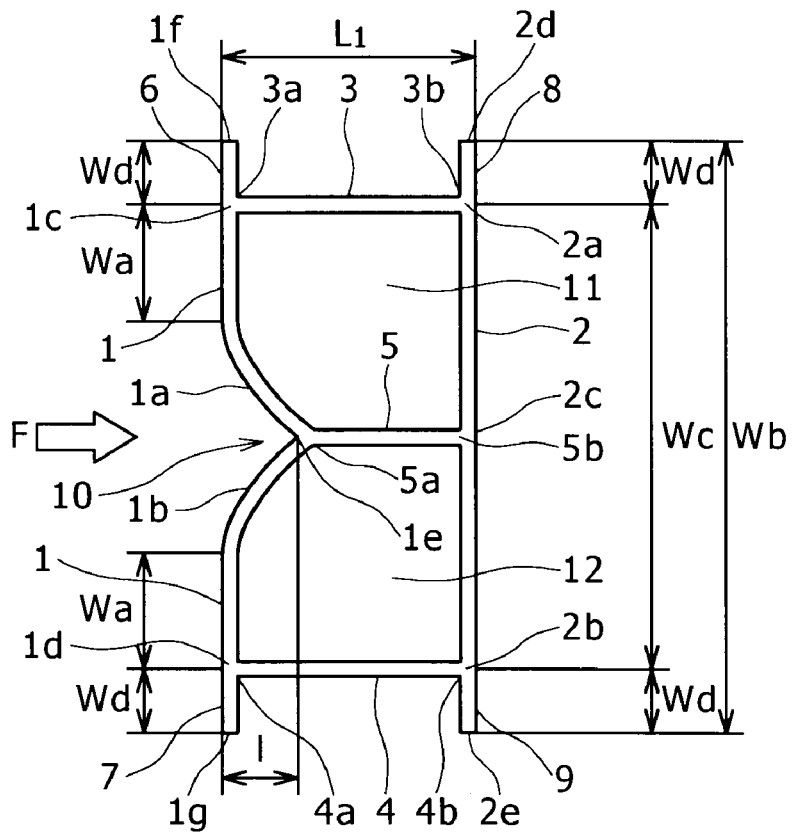
FIG. 3 is a cross-sectional (side) view for explaining reinforcement effects of a bumper reinforcement according to the present invention.

To form the concave portion 10a, first, the width between the ends 5a and 5b of the intermediate wall 5 is made smaller by length l shown in FIG. 3 than the width of each of the upper wall 3 and lower wall 4. Next, the front end 5a of the intermediate wall 5 and the middle portion 1e of the front wall 1 are connected such that the concave portion 10a is formed to extend in the longitudinal direction of the bumper reinforcement 20, i.e. along the middle portion 1e of the front wall 1. This reduces the width of the front wall 1. To be concrete, the middle portion 1e of the front wall 1 is divided into an upper middle portion and a lower middle portion by the intermediate wall 5 (5a). Middle portions 1a and 1b of the upper middle portion and lower middle portion, respectively, are each curved approximately like an arc such that their arced portions extend rearwardly of the upper and lower flat vertical portions of the front wall 1, respectively, i.e. rightwardly as seen in FIG. 1, and toward the intermediate wall 5 (5a). The approximately arced front wall portions 1a and 1b meet each other at the front end 5a of the intermediate wall 5. In this way, the width of the flat vertical portions of the front wall 1 is reduced. The front wall portions 1a and 1b need not necessarily be arced as shown in FIG. 1. They may be flat or curved differently.

According to the requirement (d), the front wall 1 opposing the direction of collision impact shown by arrow F has an arced surface which is concave toward the rear wall 2 so as to form the concave portion 10a and increase the crush strength of the front wall 1 of the bumper reinforcement 10. As long as the concave portion 10a is arced to be concave toward the rear wall 2 as described above, the arced shape of the concave portion 10a, or in other words, the arced shapes of the upper middle portion 1a and lower middle portion 1b of the front wall 1 may be changed to increase the crush strength of the front wall 1.

Figure 2:
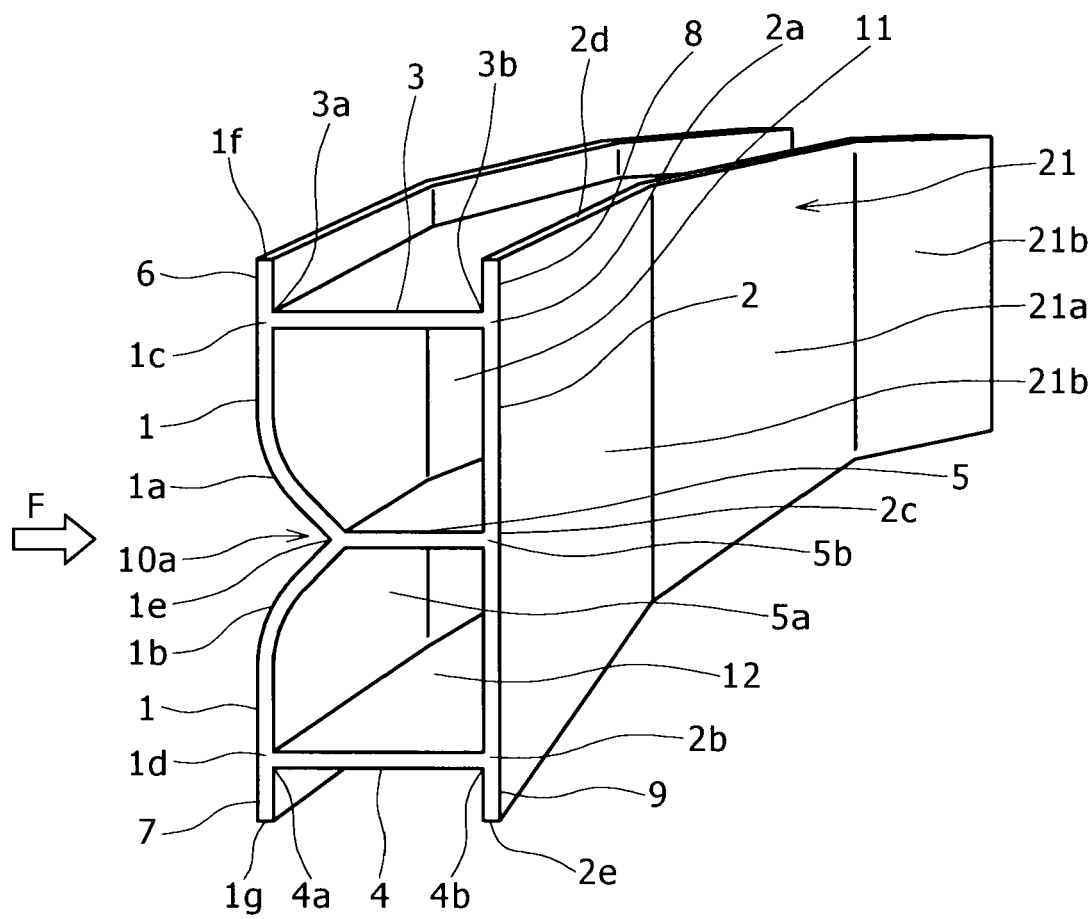
FIG. 2 is a perspective view of a bumper reinforcement according to another embodiment of the present invention.

FIG. 2 shows a perspective view of an aluminum alloy bumper reinforcement 21 according to another embodiment of the present invention. The bumper reinforcement 21 shown in FIG. 2 has a cross-sectional structure almost identical to that of the bumper reinforcement 20 shown in FIG. 1. A concave portion 10b formed in the bumper reinforcement 21 is more concave toward the rear wall 2 (rightward as seen in FIG. 2) than the concave portion 10a of the bumper reinforcement 20 with length l shown in FIG. 3 being greater for the concave portion 10b than for the concave portion 10a. Namely, the front end 5a of the intermediate wall 5 is closer to the rear wall 2 and the curvature radius of each of the upper middle portion 1a and lower middle portion 1b of the front wall 1 is smaller in the bumper reinforcement 21 shown in FIG. 2 than in the bumper reinforcement 20 shown in FIG. 1.

The hollow cross-section of each of the bumper reinforcements 20 and 21 may not necessarily be uniform along the longitudinal direction of the bumper reinforcement. It may be flexibly determined in a design stage. For example, the cross-section may be partly different somewhere along the length of the bumper reinforcement, or it may change gradually along the length of the bumper reinforcement. The shape and structure of the bumper reinforcement as a whole or of each part thereof, which are dependent on sizes, for example, lengths and widths of various parts, are determined according to requirements based on the automobile body design, for example, requirements as to the cross-sectional size (e.g. height), the crush strength, and the collision energy absorbability of the bumper reinforcement.

Operation and Effects

Features (operation and effects) meeting the above requirements (a) to (d) of the present invention which improve the bending strength and energy absorbability against a bending load resulting from a vehicle collision, i.e. a collision with a pole in the present example, will be described below with reference to FIG. 3. FIG. 3 shows a cross-sectional view (as seen from a side of the vehicle body) of an aluminum alloy bumper reinforcement, like the one shown in FIG. 2, of the present invention. The features being described below apply also to automobile body reinforcements other than a bumper reinforcement, for example, door guard bars and also when the vehicle collides with other than a pole.

Front Wall

When the front wall 1 is subjected to a collision load indicated by arrow F in FIG. 3 as a result of a vehicle collision, for example, a collision with a pole, a bending load is applied to the cross-section of a middle portion of the bumper reinforcement. This causes the front wall 1 to be subjected to compressive forces in the direction perpendicular to the plane of FIG. 3 (i.e. in the longitudinal direction of the bumper reinforcement 20 or in the vehicle width direction). In this connection, the front wall 1 is 3 mm or more thick according to the requirement (b). The large thickness of the front wall 1 increases the crush strength of the front wall 1.

According to the requirement (c), the overall vertical width of the front wall 1 is divided by the upper wall 3 and lower wall 4 into a middle front wall portion, an upper flange 6, and a lower flange 7. Furthermore, according to the requirement (d), the front wall 1 opposing the direction of collision impact shown by arrow F is provided with an arced concave portion 10 longitudinally extending along a middle portion 1e of the front wall 1.

The vertical width of the flat vertical portion of each of the upper and lower halves of the front wall 1 in a state with no concave portion formed is largely reduced, when the requirements (c) and (d) are met, from one half of the wall width Wb shown in FIG. 3 (Wb=width of the rear wall 2=width of the front wall 2) to Wa. Namely, when the requirement (c) is met, the front wall 1 is divided by the upper wall 3 and lower wall 4 thereby forming the upper flange 6 and lower flange 7. As a result, the vertical width of the flat vertical portion of each of the upper and lower halves of the front wall 1 is reduced by the vertical width Wd of the upper flange 6 or lower flange 7 and becomes equal to Wc/2. Next, when the requirement (d) is also met, the vertical width of the flat vertical portion to be a collision surface of each of the upper and lower halves of the front wall 1 that has been reduced, as described above, by the vertical width of the upper flange 6 or lower flange 7 is further reduced by the vertical width of the arced upper middle portion 1a or lower middle portion 1b of the concave portion 10 and becomes equal to Wa.

Still furthermore, when the requirement (b) is met, the front wall 1 has a large thickness. Therefore, the width-thickness ratio (wall width divided by wall thickness) of the front wall 1 as well as that of each of the upper flange 6 and lower flange 7 is largely reduced. As a result, the crush strength against the compressive force generated at a time of a collision of the front wall 1 and that of each of the end portions of the front wall 1 (i.e. each of the upper flange 6 and lower flange 7) increases.

The length l shown in FIG. 3 represents the depth from the flat vertical portions of the front wall 1 of the concave portion 10 (denoted as 10a in FIG. 1 or 10b in FIG. 2). The length l may be determined appropriately to increase the crush strength of the front wall 1 taking into consideration the curving of the upper middle portion 1a and lower middle portion 1b of the front wall 1. With the concave portion 10 formed, the width between the front wall 1 and the rear wall 2 of the intermediate wall 5 becomes L1 less l (L1−l). As a result, the strength of the intermediate wall 5 against a compressive force F applied from the front wall 1 through the intermediate wall 5 to the rear wall 2 increases.

Furthermore, with the concave portion 10a formed along the middle portion 1e of the front wall 1, the surface opposing the direction of collision indicated by arrow F of the front wall 1 is arced. As described above, when the front wall 1 is arced to be concave toward the rear wall 2, the bending crush strength of the front wall 1 of the bumper reinforcement is increased by a shell effect (an effect generated in a curved structure, in which a bending force resulting from a collision is transformed into an axial force causing the bending crush strength of the structure to be increased).

Figure 5:
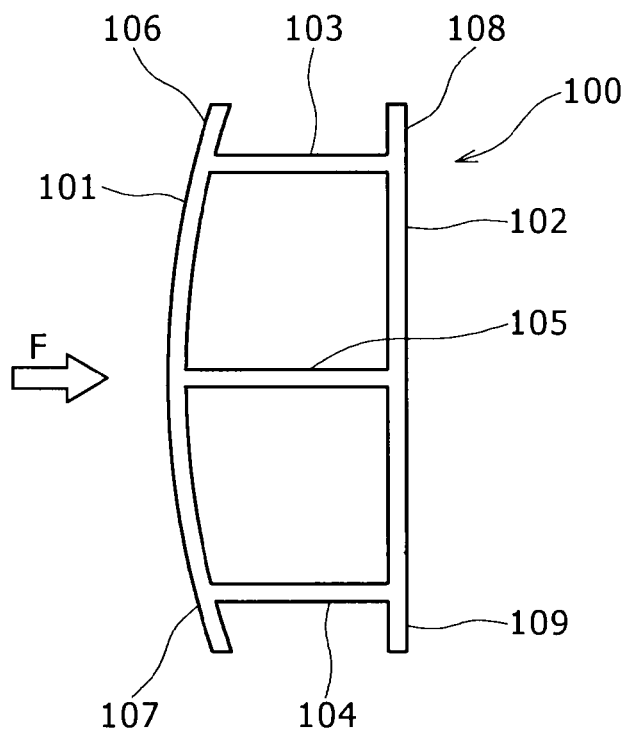
FIG. 5 is a cross-sectional (side) view of an example bumper reinforcement for comparison.
Figure 6:
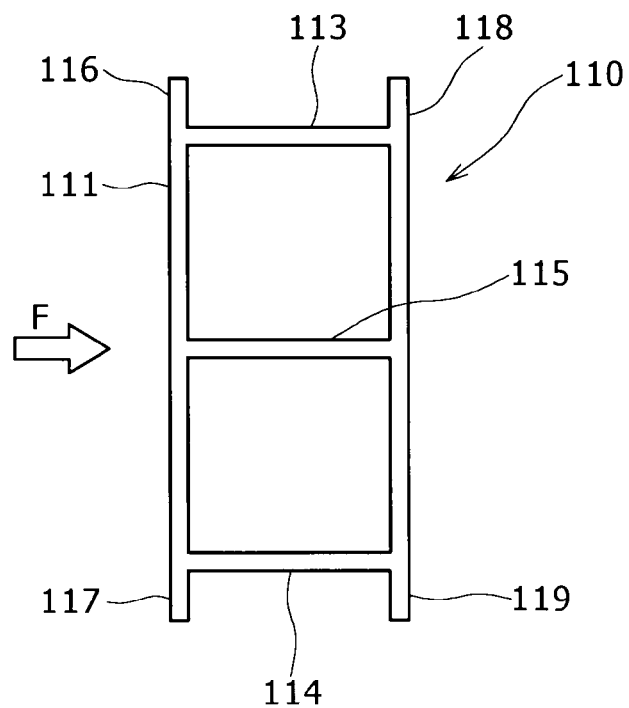
FIG. 6 is a cross-sectional (side) view of another example bumper reinforcement for comparison.
Figure 7A:
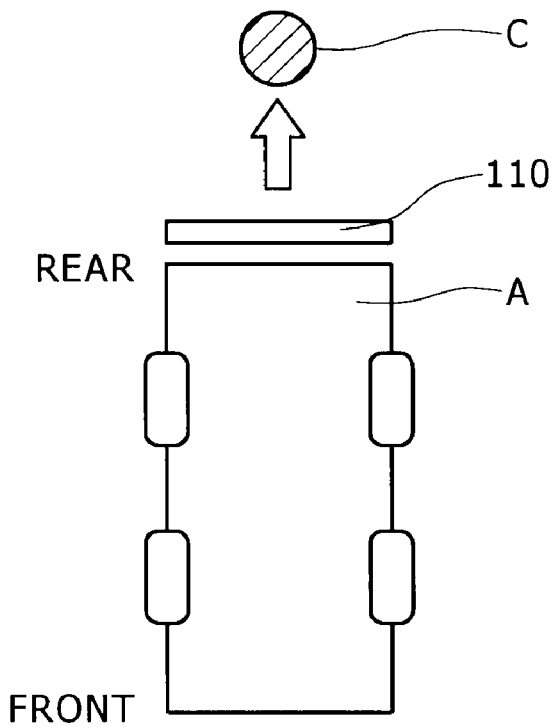
FIG. 7A is a plan view showing a bumper reinforcement before colliding with a pole.
Figure 7B:
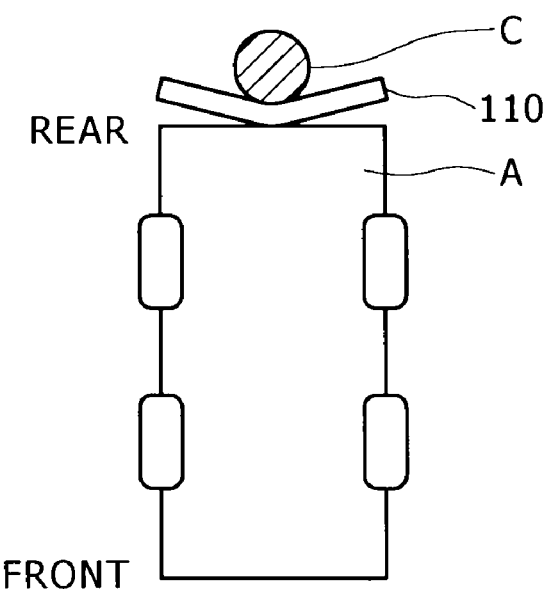
FIG. 7B is a plan view showing the bumper reinforcement deformed by the collision.

When a vehicle collides with a pole, a load generated by the collision is approximately horizontally applied concentratedly to a local portion of the bumper reinforcement used in the vehicle. If the front wall 1 is arced convexly against the direction indicated by arrow F (convex leftward as seen in FIG. 5) as shown in FIG. 5 and subjected to such a load generated by a collision with a pole, outer portions of the bumper reinforcement are concentratedly subjected to the load, and the crush strength of the bumper reinforcement often turns out inadequate even if the bumper reinforcement meets the foregoing requirements except for the requirement as to the formation of a concave portion. When this happens, the bumper reinforcement may be, as shown in FIG. 7(B), horizontally bent at a middle portion thereof to damage the vehicle. If the front wall of a bumper reinforcement is, as shown in FIG. 6, entirely flat and perpendicularly opposes the direction of collision indicated by arrow F (i.e. faces left as seen in FIG. 6), the vertical width of the flat front wall is larger than the vertical width of the flat vertical portions of a corresponding front wall having a concave portion. In this case, with the front wall having no concave portion, no effect of crush strength improvement by an arced surface is generated. In a bumper reinforcement having such a convex surface, the load generated by a collision with a pole is more quickly reduced than in the bumper reinforcement according to the present invention, so that the amount of energy absorption by such a bumper reinforcement is reduced.

As described above, when the requirements (b), (c), and (d) are met, the crush characteristics of the front wall 1, inclusive of the upper and lower flanges 6 and 7, subjected to a bending load is largely improved to make the front wall 1 more resistant to crushing. As a result, the bending crush characteristics of the bumper reinforcement at a time of a vehicle collision, for example, a collision with a pole are improved. The bending crush characteristics thus improved include the bending strength against a bending load generated at a time of a vehicle collision and energy absorbing characteristic also at a time of a vehicle collision. In other words, with various modes of collision taken into consideration including collision with a pole in which a load is approximately horizontally applied to a local portion of the bumper reinforcement, the bumper reinforcement meeting the requirements (b), (c), and (d) can meet collision safety and lightness requirements of a new severer standard. If, as shown in FIGS. 5 and 6, any of the requirements (b), (c), and (d) is not met, then the bumper reinforcement cannot meet collision safety and lightness requirements of the new severer standard.

Rear Wall

When a load, indicated by arrow F in FIG. 3, generated by a vehicle collision with a pole is applied to the rear wall 2, lateral tensile forces (i.e. tensile forces directed in the direction perpendicular to the plane of FIG. 3/the longitudinal direction of the bumper reinforcement 20/the vehicle width direction) are generated in the rear wall 2 unlike in the foregoing case of the front wall 1. However, when a vehicle including a bumper reinforcement which has an approximately rectangular hollow structure with a closed cross-section collides with a pole causing a resultant load to be approximately horizontally applied concentratedly to a local portion of the bumper reinforcement, not only the tensile forces are generated as described above in the rear wall 2 but also compressive forces (i.e. compressive forces directed in the direction perpendicular to the plane of FIG. 3/the longitudinal direction of the bumper reinforcement 20/the vehicle width direction) are applied to both fixed end portions (i.e. lateral end portions each fixed by a stay of the bumper reinforcement) of the rear wall 2. The crush strength of the rear wall 2 against a vehicle collision with a pole cannot be made adequately high without taking into consideration such compressive forces applied to both end portions of the rear wall 2.

In the bumper reinforcement according to the present invention, however, the rear wall 2 is divided, in accordance with the requirement (b), by the upper wall 3 and lower wall 4 defining the upper flange 8 and lower flange 9. As a result, the vertical width of each of the upper and lower halves of the rear wall 2 is reduced by the vertical width Wd of the upper flange 8 or lower flange 9 and becomes equal to Wc/2. This also results in the small vertical width Wd of each of the upper flange 8 and lower flange 9 of the rear wall 2. Whereas the vertical width of the rear wall 2 is reduced as described above, the rear wall 2 has a large thickness in accordance with the requirement (b). Therefore, the width-thickness ratio (wall width divided by wall thickness) of the rear wall 2 as well as that of each of the upper flange 8 and lower flange 9 is largely reduced. As a result, the crush strength against the compressive forces generated at a time of a pole collision of each of the upper flange 8 and lower flange 9 increases. The crush strength against the tensile forces generated in both fixed end portions of the front wall 1 also increases.

The crush strength of the rear wall 2 inclusive of the upper flange 8 and lower flange 9 is largely increased by meeting the requirements (b) and (c). With the requirements (b) and (c) met, even when the vehicle collides with a pole generating a load approximately horizontally applied concentratedly to a local portion of the bumper reinforcement, the rear wall 2 is not easily crushed. That is, the bending crush characteristics including the strength against a pole collision of the bumper reinforcement and the vehicle collision safety are largely improved.

Aluminum Alloy for Bumper Reinforcement

The aluminum alloy of which the bumper reinforcement of the present invention is to be made is desired to have high strength so as to make the bumper reinforcement light in weight and highly resistant against impact from a pole collision. The aluminum alloy is preferred to be one suitable for extrusion to form a hollow structure. Generally, such aluminum alloys as 5000-, 6000-, and 7000-series aluminum alloys which have relatively high strength and which are used to form structural members similar to bumper reinforcements are adopted as material having the characteristics required to form a bumper reinforcement meeting the foregoing requirements. To form such a bumper reinforcement, a selected aluminum alloy is hot-extruded into a hollow structure and then subjected to such treatments as solution heat treatment and aging treatment to obtain required mechanical properties.

EMBODIMENTS

Experiments were carried out to evaluate, in terms of pole collision strength, the example bumper reinforcements shown in FIGS. 1 and 2 of the present invention and the example bumper reinforcement shown, for comparison purposes, in FIG. 6.

For the experiments, a pole collision was simulated as follows. A bumper reinforcement collides, at a front middle portion thereof, with a rigid pole with a radius of 127 mm. Based on the simulation, the initial buckling load applied to a local area of the front middle portion, the load energy absorption performance of the bumper reinforcement, and the bending moment generated in the bumper reinforcement were analyzed. Even though the vehicle was assumed to weigh 1.0 to 1.8 tons and collide with a pole at a speed of 8 to 64 km/h, the analysis was made based on static compression experiments.

As for the cross-sectional shape, with reference to FIG. 3, each bumper reinforcement was assumed to have a front wall vertical width Wa of 42.57 mm (the bumper reinforcement 20 shown in FIG. 1) or 43.46 mm (the bumper reinforcement 21 shown in FIG. 2), a rear wall vertical width Wb of 150.0 mm, a length L1 in the vehicle longitudinal direction of 65.0 mm, and a flange width (projection) Wd of 12 mm. To analyze basic characteristics against bending, 1300 mm long, linear bumper reinforcements were used. For the experiments, longitudinal end portions on both sides of each bumper reinforcement was rotatably supported from below (pinned support) using cylindrical supports positioned 1100 m apart from each other. The bumper reinforcements used in the experiments were each made of extruded and artificially aged 7000 series aluminum alloy with a 0.2% yield strength of 435 MPa. A bumper reinforcement having, as shown in FIG. 6, a same-shaped front wall and rear wall each with an upper end portion projecting upward like a flange and a lower end portion projecting downward like a flange was also tested for comparison purposes.

Figure 8:
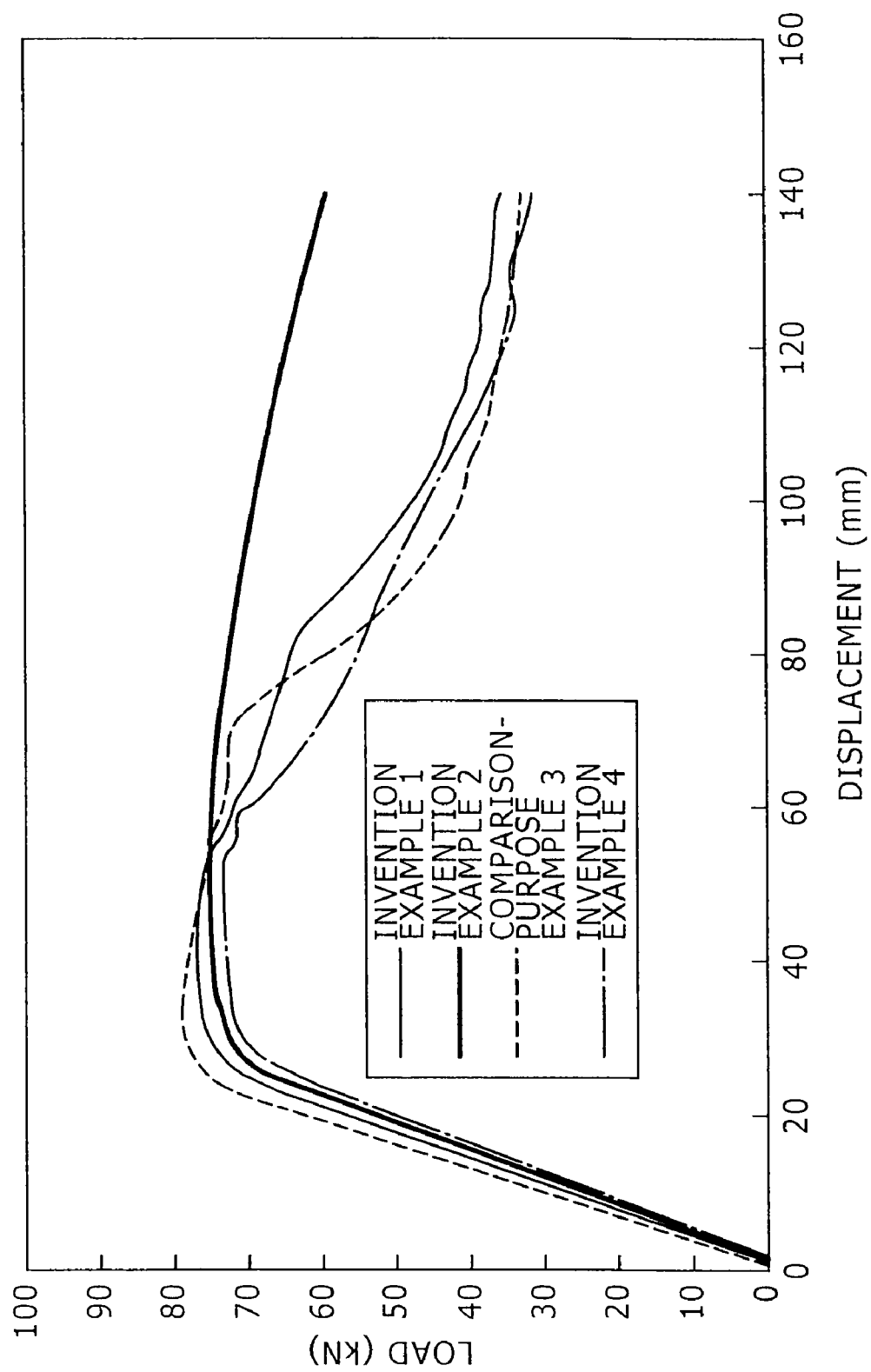
FIG. 8 is an explanatory diagram showing relationships between loads applied to and displacements of example bumper reinforcements according to embodiments of the present invention.

FIG. 8 shows relationships between buckling loads applied to and displacements of the bumper reinforcements, including those according to the present invention and one for comparison purposes, used in the experiments. The amounts of energy absorption (kJ) and maximum moments (kN·m) recorded by the respective bumper reinforcements at an initial buckling load (kN) and a displacement of 100 mm are listed in Table 1.

As is clear from Table 1 and FIG. 8, the experiment results on an invention example 1 represented by a fine solid-line curve in FIG. 8 and those on an invention example 2 represented by a bold solid-line curve in FIG. 8 are approximately the same as those on a comparison-purpose example 3 represented by a bold broken-line curve in FIG. 8 in terms of pole collision characteristics, for example, as to the initial maximum load (kN) and the maximum bending moment (kN·m) that is proportional to the initial maximum load. The amount of energy absorption (kJ) at a constant displacement of 100 mm, however, can be increased in the invention examples in which the load decreases relatively slowly from its maximum level. This is particularly conspicuous in the invention example 2 having a large concave portion.

Compared with the invention example 2, the invention example 1 does not appear so much advantageous over the comparison-purpose example 3 as to the energy absorption amount and initial buckling load. The only difference between the invention example 1 and invention example 2 is in the depth (represented by length l shown in FIG. 3) of the concave portion (10*a* in the invention example 1 and 10*b* in the invention example 2) toward the rear wall 2. Namely, the concave portion 10*b* (shown in FIG. 2) of the invention example 2 is deeper than the concave portion 10*a* (shown in FIG. 1) of the invention example 1. Thus, comparison between the invention examples 1 and 2 and the comparison-purpose example 3 indicates that the energy absorption amount and the value of initial buckling load are affected by the depth of the concave portion 10*a* or 10*b*. The concave portion 10*a* of the invention example 1 may be regarded as indicating a minimum significant depth of such a concave portion. It also exemplifies that, to obtain an optimum effect of the concave portion, an optimum depth of the concave portion requires to be determined. The embodiment results described above clarify the advantageous effects of the present invention and the significance of the bumper reinforcement structure of the present invention.

The invention example 4 represented by a bold chain-line curve in FIG. 8 represents a bumper reinforcement having a rear wall 2 thicker than a front wall 1. Increasing the thickness of the rear wall 2 increases the strength and rigidity of a central portion of the rear wall 2, at which the load generated at a time of a pole collision tends to concentrate and which is therefore easily cracked, and thereby prevents the central portion from being easily cracked. This enables the bumper reinforcement to fully display its performance. Generally, there can be cases where, depending on the condition of collision with a pole, the central portion of the rear wall 2 is cracked and, as a result, the bumper reinforcement is disabled. The invention example 4 having the rear wall 2 with an increased thickness prevents the central portion of the rear wall 2 from being easily cracked and thus enables the bumper reinforcement to display its performance.

Furthermore, in the invention example 4 in which the rear wall 2 has an increased thickness, the front wall 1 has a correspondingly decreased thickness. This is to make up for the weight increase caused by increasing the thickness of the rear wall 2 or to minimize such a weight increase and keeps the bumper reinforcement light as the unit weights (g/m) listed in Table 1 show. A bumper reinforcement can also have a rear wall with an increased thickness without, unlike what is done for the invention example 4, correspondingly reducing the thickness of its front wall. It then becomes possible to increase the maximum load that can be applied to the bumper reinforcement and slow down dropping of the load from its maximum level. In this way, the amount of energy absorption by the bumper reinforcement can be increased. As described above, the present invention can generate superior effects making it possible, by adjusting the thicknesses of the rear wall 2 and front wall 1, to flexibly adjust or design the performance of the bumper reinforcement as to, for example, the maximum applicable load and the amount of energy absorption while taking into consideration the weight of the bumper reinforcement.

TABLE 1

| | Bumper reinforcement conditions | | | | | | | Pole collision characteristics of bumper reinforcement | | |
|---|---|---|---|---|---|---|---|---|---|---|
| | Wall thickness (mm) | | | | | | | | | |
| No. | Front wall 1 | Rear wall 2 | Upper wall 3, lower wall 4, Intermediate lib 5 | Length l (mm) of concave portion 10 | Cross-sectional shape | Projection (mm) | Unit weight g/m | Initial buckling load kN | Energy absorption (kJ) (at 100 mm displacement) | Maximum moment kN · m |
| 1 | 4.6 | 4.4 | 3.0 | 11.8 | FIG. 1 | 12 | 4975 | 76.9 | 6.00 | 21.2 |
| 2 | 4.6 | 4.4 | 3.0 | 20.0 | FIG. 2 | 12 | 5031 | 75.1 | 6.29 | 20.7 |
| 3 | 4.6 | 4.4 | 3.0 | — | FIG. 6 | 12 | 5006 | 78.5 | 6.00 | 21.6 |
| 4 | 4.4 | 4.6 | 2.6 | 20.0 | FIG. 2 | 12 | 4855 | 73.5 | 5.50 | 20.2 |

Figure 9:
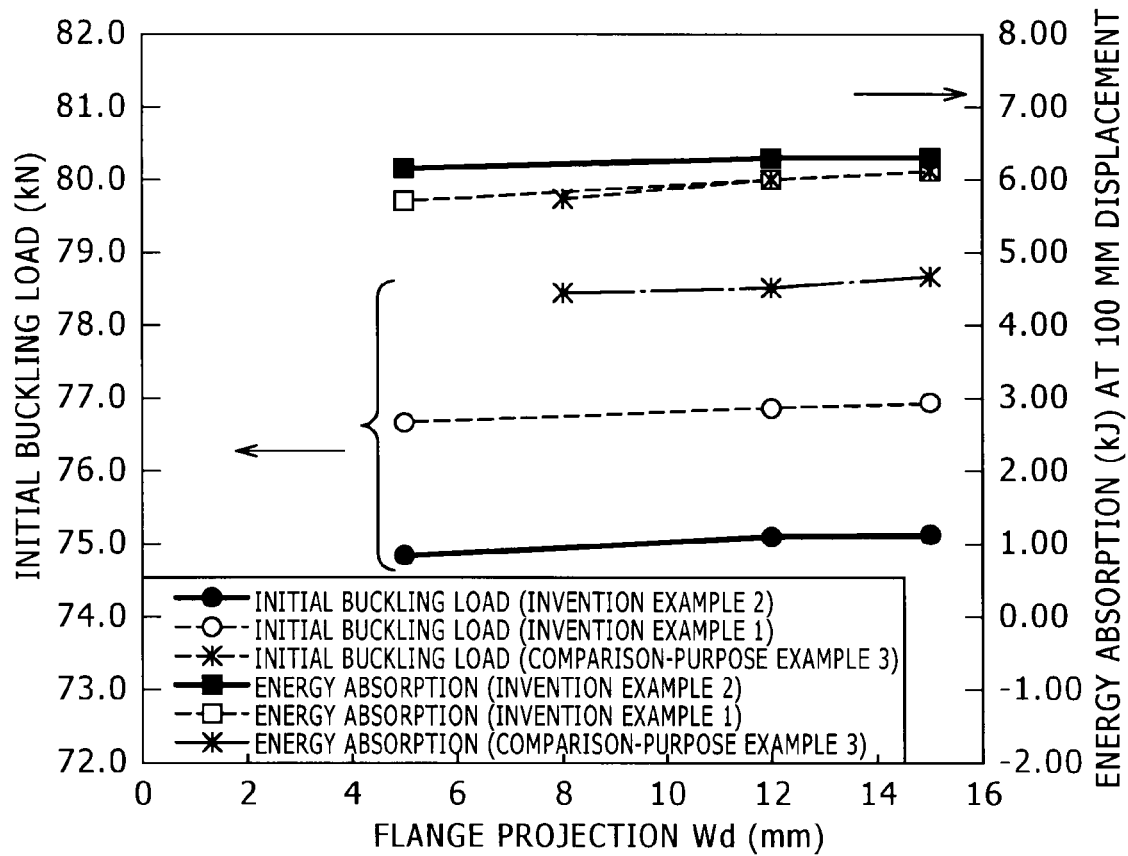
FIG. 9 is an explanatory diagram showing relationships between flange widths Wd and various performance items of the example bumper reinforcements.

FIG. 9 shows relationships between the flange widths Wd (flange projection in mm represented by horizontal axis) of the example bumper reinforcements listed in Table 1 and performance items (initial buckling load in kN represented by the left vertical axis, and energy absorption amount in kJ at a displacement of 100 mm represented by the right vertical axis). For the analysis, results of which are shown in FIG. 9, the cross-sectional dimensions of the bumper reinforcements were assumed to be the same as listed in Table 1, but the flange width Wd (indicated as flange projection along the horizontal axis in FIG. 9) of each bumper reinforcement was varied from 5 mm to 15 mm (in Table 1, Wd is constant at 12 mm).

In FIG. 9, the analysis results on the invention examples 1 and 2 having the concave portions 10a and 10b mutually differing in concave portion length l and the comparison-purpose example 3 are compared in the same graph. As for the initial buckling load represented by the left vertical axis, as the lower three data curves denoted by a left-pointing arrow show, the values indicated for the invention example 1, whose concave portion length l is small, (represented by a broken-line curve including white circles) are higher than those indicated for the invention example 2, whose concave portion length l is large, (represented by a solid-line curve including black circles) regardless of the flange width (flange projection) Wd. Conversely, as for the energy absorption amount represented by the right vertical axis, as the upper three data curves denoted by a right-pointing arrow show, the values indicated for the invention example 2, whose concave portion length l is large, (represented by a solid-line curve including black squares) are higher than those indicated for the invention example 1, whose concave portion length l is small, (represented by a broken-line curve including white squares). The difference in energy absorption amount between the invention examples 1 and 2 becomes smaller as the flange width Wd represented by the horizontal axis increases. This also shows an effect of increasing the flange width Wd.

As shown in FIG. 9, as the value of Wd represented by the horizontal axis increases, both the value of the initial buckling load represented by the left vertical axis and that of the energy absorption amount represented by the right vertical axis tend to increase for each of the example bumper reinforcements. The rate of increase of the initial buckling load and energy absorption amount, however, drops after the value of Wd reaches 12 mm. Namely, there is an optimum range of flange width (flange projection) Wd in which the initial buckling load and the energy absorption amount can be increased. Based on the experiment results shown in FIG. 9, a Wd range of 12 mm to 15 mm can be said optimum. This corresponds to a range of unitless values of 0.08 to 0.1 obtained by dividing the flange width Wd by the rear wall width Wb. In other words, a preferable range of ratio Wd/Wb is 0.08 to 0.1 where Wd is the flange width of an automobile body reinforcement and Wb is the vertical width Wb of the rear wall of the automobile body reinforcement.

According to the present invention, an aluminum alloy automobile body reinforcement, for example, a bumper reinforcement or a door guard bar can be provided which has high bending crush characteristics, for example, high bending strength and high energy absorbability against the bending load generated at a time of a vehicle collision and which can provide high collision safety without requiring an additional reinforcement. Thus, the present invention can largely expand the range of applications of aluminum alloy automobile body reinforcements, so that its significance in industrial fields is great.

Although the invention has been described in its preferred embodiments with a certain degree of particularity, obviously many changes and variations are possible therein. It is therefore to be understood that the present invention may be practiced otherwise than as specifically described herein without departing from the scope and spirit thereof.

What is claimed is:

1. An automobile body reinforcement comprising a hollow aluminum alloy extrusion having an approximately rectangular cross-section, wherein:

(a) the approximately rectangular cross-section includes a front wall extending approximately vertically, a rear wall being spaced from the front wall and approximately vertically extending approximately in parallel with the front wall, an upper wall and a lower wall being spaced from each other and extending approximately horizontally, and an intermediate wall approximately horizontally extending and interconnecting middle portions of the front and rear walls;

(b) the front and rear walls are each at least 3 mm thick, and the upper, lower, and intermediate walls are thinner than the front and rear walls;

(c) the upper wall interconnects an upper portion lower than an upper end of the front wall and an upper portion lower than an upper end of the rear wall, the lower wall interconnects a lower portion higher than a lower end of the front wall and a lower portion higher than a lower end of the rear wall, and upper and lower end portions of each of the front and rear walls form flange portions extending upwardly and downwardly, respectively; and (d) the front wall exhibits a concave portion defined by vertically extending arcuate portions extending above and below the intermediate wall from where the front wall joins the intermediate wall, the arcuate portions being exteriorly convex along their vertical extent, whereby the front wall connects to the intermediate wall at a location closer to the rear wall than the location where the front wall connects to the upper and lower walls, the arcuate portions extending along a longitudinal direction of the automobile body reinforcement.

2. The automobile body reinforcement according to claim 1, wherein the rear wall is thicker than the front wall.

3. The automobile body reinforcement according to claim 1, wherein a ratio of Wd to Wb is in a range of 0.08 to 0.1, Wd being a vertical width of each of the flange portions, Wb being a vertical width of the rear wall.

* * * * *